(12) United States Patent
Hart et al.

(10) Patent No.: US 8,140,752 B2
(45) Date of Patent: Mar. 20, 2012

(54) METHOD OF EXECUTING A BACKGROUND TASK AND AN ARRAY CONTROLLER

(75) Inventors: Nigel Paul Hart, Lake Mary, FL (US); Phil John Ruff, Sycamore, IL (US)

(73) Assignee: Xyratex Technology Limited, Havant (GB)

( * ) Notice: Subject to any disclaimer, the term of this patent is extended or adjusted under 35 U.S.C. 154(b) by 687 days.

(21) Appl. No.: 12/212,127

(22) Filed: Sep. 17, 2008

(65) Prior Publication Data

US 2009/0083319 A1    Mar. 26, 2009

Related U.S. Application Data

(60) Provisional application No. 60/973,967, filed on Sep. 20, 2007.

(51) Int. Cl.
*G06F 12/00* (2006.01)

(52) U.S. Cl. .................. 711/114; 711/154; 707/692

(58) Field of Classification Search .............. 707/691, 707/692; 714/6.1, 6.22, 6.24
See application file for complete search history.

(56) References Cited

U.S. PATENT DOCUMENTS

| 6,851,070 | B1 | 2/2005 | Rodriques | |
|---|---|---|---|---|
| 7,137,038 | B2 * | 11/2006 | New et al. | 714/42 |
| 7,225,314 | B1 * | 5/2007 | Bonwick et al. | 711/170 |
| 2005/0028048 | A1 | 2/2005 | New et al. | |
| 2008/0288436 | A1 * | 11/2008 | Priya N V | 706/48 |
| 2009/0089534 | A1 * | 4/2009 | Zohar et al. | 711/173 |

* cited by examiner

*Primary Examiner* — John Lane
(74) *Attorney, Agent, or Firm* — Pillsbury Winthrop Shaw Pittman LLP

(57) ABSTRACT

The present invention provides a method of executing a background task on an array of data storage devices, the method comprising recording information about where in an array data is stored and executing a background task only on those regions of the array in which data is stored.

23 Claims, 6 Drawing Sheets

METHOD OF EXECUTING A BACKGROUND TASK AND AN ARRAY CONTROLLER

CROSS REFERENCE TO RELATED APPLICATIONS

This application claims the benefit of priority of U.S. provisional application Ser. No. 60/973,967, filed Sep. 20, 2007, the entire contents of which is incorporated herein by reference.

RAID (redundant array of inexpensive disks or redundant array of independent drives) is a well known system and methodology by which redundancy can be provided in the storage of data. RAID is a data storage scheme that typically uses multiple data storage devices to share or replicate data. The data storage devices are typically magnetic hard disks but may in principle be any suitable storage device, such as optical disks, silicon memory chips, etc.

There are a number of different "levels" of RAID systems. With a RAID 1 system, data is mirrored meaning that an exact replica of the data on one disk or plurality of disks is provided on a second disk or a second plurality of disks (optionally at a location remote from the original). If some disaster befalls the first of the disks (or plurality of disks), then the copy of the data on the second disk (or plurality of disks) may be used. Such a system is expensive and will become more so as data storage capacity requirements increase because for each copy of data, an equivalently sized disk or memory resource is required.

RAID 0 uses striping to optimise performance. Data is organised in a RAID 0 array such that the data is striped across multiple disks. Within RAID technology striping refers to the practice of placing each strip of a stripe of data onto a different disk, thereby allowing parallel access to that stripe. The striping enables the array to access data from multiple disks at the same time.

Within the RAID systems, the term "strip" is often used synonymously with what is called a block or "fragment" in the present application. Fragment used herein refers to any portion of a data file.

In other RAID systems, namely RAID 3, 4 and 5, the striping of data described in RAID 0 is used but in a manner that achieves a high level of data integrity or fault tolerance. The data in RAID 3 and 4 is striped across all but one of the disks in an array. This final disk is used to store parity information that is used to maintain data integrity across all disks in the subsystem. Data on the parity drive is also divided into stripes, and each stripe of parity data includes parity information for the corresponding data stripes dispersed throughout the other disks in the array.

In RAID 5 systems, the mechanism of RAID 3 and 4 is used, but with the inclusion of distributed parity. Accordingly, in RAID 5, parity data is also written across all the disks in an array rather than all parity data being stored on only one disk. A central controller is used to distribute each of the stripes or blocks of a file to one of plural disks or other such storage media.

The parity data is such that when one of the disks fails (and therefore the strips/fragments stored on the failed drive become unavailable), data stored in the array can still be accessed. This is achieved by use of the parity data to calculate the missing content. An example of a well known algorithm for achieving this functionality relies on the use of an "XOR" logical function.

To maintain the integrity of data stored on any of the above described arrays, periodic background tasks are performed on the data. These background tasks include parity scrubs (array verification), scanning, extent defragmentation, integrity testing, rebuilds and the like. These are long-running processes (LRPs) which compete with host input/output for RAID resources, and if not scheduled appropriately can seriously affect host input/output performance.

Currently background tasks are based on the assumption that all disks in an array hold the maximum capacity of data and the background tasks are therefore processed on the entirety of each disk in an array. However, in recent times, the technology of arrays has progressed such that the size of arrays and therefore the amount of data they can hold has increased significantly. Unfortunately, the performance of the LRPs has not progressed in the same way and therefore LRPs are taking longer to execute. Current times for at least some of these processes to complete are measured in days. During this time the performance of the array as perceived by a user is negatively affected. To avoid this, in many systems, as the input/output performance requirements increase, background tasks are more frequently interrupted mid-execution in favour of foreground tasks.

Various scheduling algorithms now exist that attempt to minimise the problems caused by such a mid-execution interruption of an LRP. Often, if a background task is interrupted prior to completion, it begins again at the beginning of an array when it is restarted. As a result, on some occasions and where an array is particularly large, a background task is not, or is infrequently, performed on some regions of an array. As a result, any reduction in the time required for execution of a background task is of great importance to end users.

U.S. Pat. No. 6,851,070 discloses a system and method for managing LRPs that are limited by time restrictions imposed by a host server. A record is kept of the length of time that has passed since a LRP was last processed on a region of the array. When the LRP is next executed, it begins in the region of the array that has the longest time period since it was last acted on. This ensures that all data stored in the array is acted on by the LRP at some time. However, as the LRP is still interrupted, the LRP is not processed on all data as often as it should.

US-A-2005/0028048 discloses a system of autonomous scrubbing of data in a RAID array. The data scrubbing may be interrupted upon an input/output request from the RAID controller and the described method attempts to minimise disruption caused by such interruptions. Specifically, US-A-2005/0028048 discloses a method of prioritising the order in which regions of the RAID array are scrubbed. The method includes selecting for scrubbing first those regions of the array to which data has been written more recently than other data or selecting regions of the disk that have been more frequently accessed. Once these specific regions have been scrubbed, the remainder of the array is then scrubbed.

Accordingly it is clear that although attempts have been made to overcome some of the problems caused by time consuming background tasks and interruptions to these tasks, no attempt has yet been made to minimise the work required during a background task.

According to a first aspect of the present invention, there is provided a method of executing a background task on an array of data storage devices in which data is stored, the method comprising recording information about where in the array data is stored; and executing a background task only on those regions of the array in which data is stored.

By way of this method the amount of work required by a background task at any one time is minimised as the background task is not executed on regions of an array that are not in use. By minimising the amount of work required, the length of time required for a background task to complete is also reduced and so the burden on the processing resources of a system is reduced. Furthermore, the inclusion of only those regions of the array where data is stored and the resulting reduction in overall time of execution of a background task means that generally background tasks will not be interrupted as frequently and all data stored in an array will be subjected to a background task at more frequent intervals.

Recording information may comprise recording the address of at least one location in the array to which data is written. Preferably, a data structure using logical block addressing is used to record where in an array data has been written.

According to a second aspect of the present invention, there is provided a method of executing a background task on an array of data storage devices, the method comprising recording information about where in an array data content is changed following completion of the last execution of a background task; and executing the background task only on those regions of the array where the data content has been changed since the last execution of the background task. This embodiment minimises the amount of work required for a background task by limiting the regions of the array upon which the background task should be executed to only those regions that have been changed. Accordingly, regions of the array to which data has been written but for which the data content has not changed since the last execution of that background task do not need to be included.

Preferably the method comprises deleting recorded information once the background task has been executed on the region of the array to which said recorded information relates. Once the background task has completed, new entries can be made as and when the data content of different regions of the array is changed.

In an embodiment, the method comprises monitoring the amount of recorded information; and deleting the recorded information once the amount of recorded information reaches a predetermined level. If the background task is to be performed on a significant proportion of the array, then it may be more time efficient and less wasteful of the resources of a system to execute the background task on the entire array. Additionally and/or alternatively, if a record has been kept of the regions of the array that have been written to, and a significant proportion of these regions have been changed, then the system can revert to executing the background task only on those regions of the array that have been written to.

In an alternative embodiment, once the amount of recorded information reaches a predetermined level, the background task is initiated.

Alternatively and/or additionally, the method comprises monitoring the number of regions for which information is recorded. Once the number of regions for which information is recorded reaches a predetermined percentage of the total number of regions of the array the recorded information may either be deleted or the background task initiated.

In a preferred embodiment, recording information comprises ignoring any attempt to record information for a location in the array for which an entry has already been made since the last execution of the background task. Once a first entry is made for a specific location, the background task will automatically be executed on that region. Accordingly, it is not necessary to make more than one entry for the same location between subsequent executions of the same background task.

According to a third aspect of the present invention there is provided an array controller for causing a background task to be executed on an array of data storage devices, the array controller comprising a processor arranged to record information about where in an array data is stored; and in accordance with the recorded information, initiate execution of a background task only on the regions of the array in which data is stored.

According to a fourth aspect of the present invention there is provided an array controller for causing a background task to be executed on an array of data storage devices, the array controller comprising a processor arranged to record information about where in an array data content is changed following completion of the last execution of a background task; and in accordance with the recorded information, initiate execution of a background task only on the regions of the array in which the data content has been changed since the last execution of the background task.

Embodiments of the present invention will hereinafter be described by way of example with reference to the accompanying drawings, in which.

It is often the case that the amount of data stored in an array of data storage devices occupies only a small proportion of the actual capacity of the array. In this respect, prudent system administrators allocate more capacity to an array than the amount of data that will be written to it. Administrators are taking into account a growth in data of approximately 30 to 50% per annum and an expected lifetime of 2 years for a typical array. Typically, upon installation, only 25% of the space available is used. It is only towards the end of the life of an array that the full capacity of the array would be close to complete usage.

The description herein refers to an array of disks. However, it will be appreciated that the embodiment described may be applied to an array of any type of data storage device, for example, compact disks, digital versatile disks, solid state memory, etc.

Figure 1:
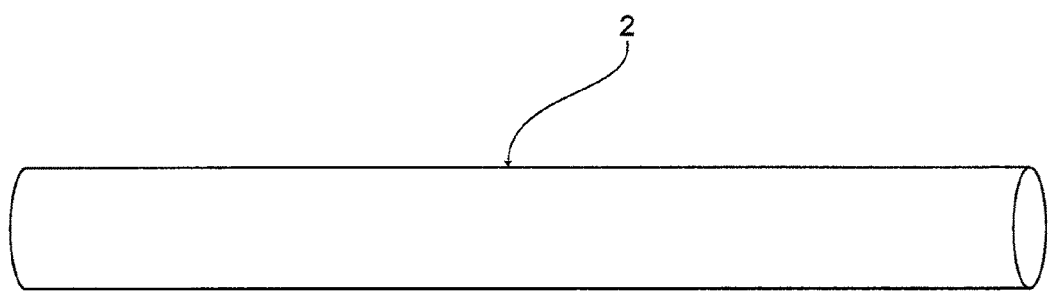
FIG. 1 shows schematically an example of a disk surface with no data written to it.
Figure 2:
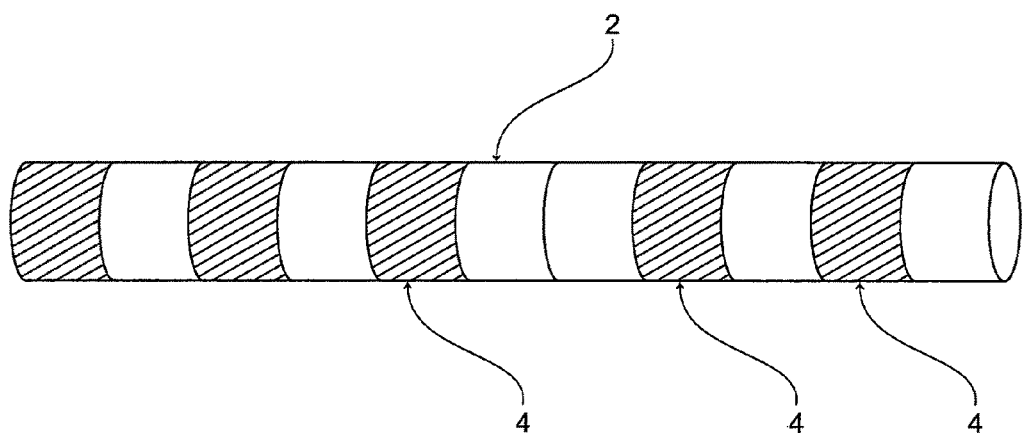
FIG. 2 shows the disk surface of FIG. 1 with regions of stored data.

FIG. 1 shows schematically an example of a disk surface 2 with no data written to it. FIG. 2 shows the same disk surface with regions of data 4. It is clear that a significant proportion of the available data capacity on the disk is not occupied.

The description herein relates to a RAID (Redundant Array of Inexpensive Disks) 5 type configuration in which a file can be recovered even if one of its fragments is lost, by use of calculation of an XOR function with the other fragments. However, the embodiment described may also be applied to a RAID 3 or 4 type configuration, or any other data storage system where background tasks are executed on data stored on a disk or other data storage device.

Background tasks, or long-running processes, that are applied to data stored in such an array of disks are well known. Examples of the type of background task that may be applied are parity scrubs (also known as array verifiers), scanning, extent defragmentation, integrity testing and rebuilds.

A parity scrub involves using fragments of a data file stored in one stripe of an array to determine if the corresponding parity data stored is correct. In this respect, if some mishap has occurred and the parity data is incorrect, any reconstruction of a fragment of that data file, for example when a disk is unavailable, that uses the incorrect parity data would also be incorrect. Accordingly, it is imperative that all data stored in an array is subjected to a parity scrub on a periodic basis. For example, such a parity scrub may be performed every 24 hours to ensure the integrity of the data stored in the disks of an array.

A rebuild involves reconstructing and replacing out-of-date data stored on one of the array disks when, for example, one of the disks has been temporarily unavailable. As described above, any fragment of a data file may be reconstructed using the remaining fragments of that data file and the corresponding parity data. A record may be kept of any data that may be out of date, and then, at an appropriate time, the data can be rebuilt and the array updated. Again, such a background task need not be applied continuously and may instead be applied at periodic intervals to be determined by the system administrator.

Such background tasks are run in the background to prevent the unacceptable effect they would have on host input/output performance if they were run as foreground tasks. This is particularly important for systems that provide a high throughput, 24 hour service. However, even when such tasks are run in the background, they still increase the burden on a processor. It is therefore desirable to minimise the amount of processing required by such background tasks.

Figure 4:
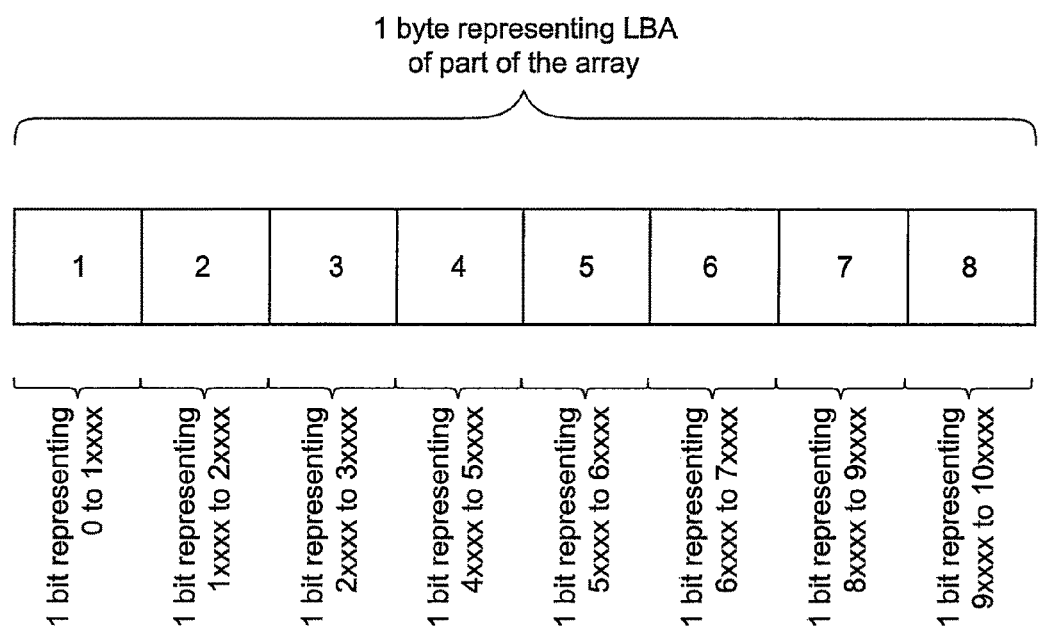
FIG. 4 shows an example of a data structure that may be used in an embodiment of the present invention to store information about where in an array data has been written and/or changed.

In a preferred embodiment, a record of updates to the data content of an array is kept. FIG. 4 shows a possible embodiment of such a record of updates in the form of a data structure using logical block addressing (LBA). Each bit of a byte of the data structure represents a certain region of an array. When a change is made to the data content of a region of the array, the bit representing that region of the array may be altered in some way to indicate the change. For example, if data is written or rewritten to a region of the array of disk drives, or if existing data is deleted, a bit representing that region will be altered to reflect the change. The alteration does not need to be specific about the form of change.

The embodiment shown in FIG. 4 shows a simplistic 8 bit data structure that provides a simple check method that can be implemented in hardware. Each bit of the byte represents a different region of a disk of an array. When data is added to the array, or if stored data is changed, the bit representing that region is changed. It will be appreciated that the described approach can also be used on a much larger scale. However, use of this method does involve a trade off of accuracy versus speed. In this respect, if each bit represents a large region of an array, fewer bits are required to represent the entire array. Accordingly, this minimises the amount of processing required to maintain this record of updates. However, there is then a chance that a background task will still be executed on large regions of an array where it is not required. By contrast, if each bit represents a smaller region of an array, then although the amount of processing required to maintain the record of updates increases, the overall processing required by a background task should decrease. In addition to this, the amount of memory required for LBA can be very large. Accordingly, to avoid slowing down the process, each bit should preferably represent a large region of the array.

Described below are two preferred modes of operation.

In a first embodiment, a record is kept of all entries made to an array. Preferably, as described above, the record is in the form of a list of addresses of locations in the array to which data has been written. When a background task is scheduled to be executed on data stored in an array, this record is consulted to determine where in the array data is stored. The background task is then executed on only those regions of the array in which data is stored. This minimises the burden on the system processor by not performing the background task on regions of the array where it is not required. Alternatively or additionally, as this minimises the time that the background task is likely to run, data stored in the array can be subjected to the background task on a more frequent basis.

Once the data in an array occupies a certain pre-determined percentage capacity of the array, the record of entries may be deleted. In this respect, once the amount of the array that is occupied reaches a certain level relative to the overall capacity of the array, it may be more economical on the processing resources of the system processor to execute the background task on the entire array, rather than to maintain a record of regions of the array to which data has been written.

Alternatively, a threshold can be set for the amount of recorded information. Once a predetermined amount of information has been recorded, the background task can be initiated.

Figure 3:
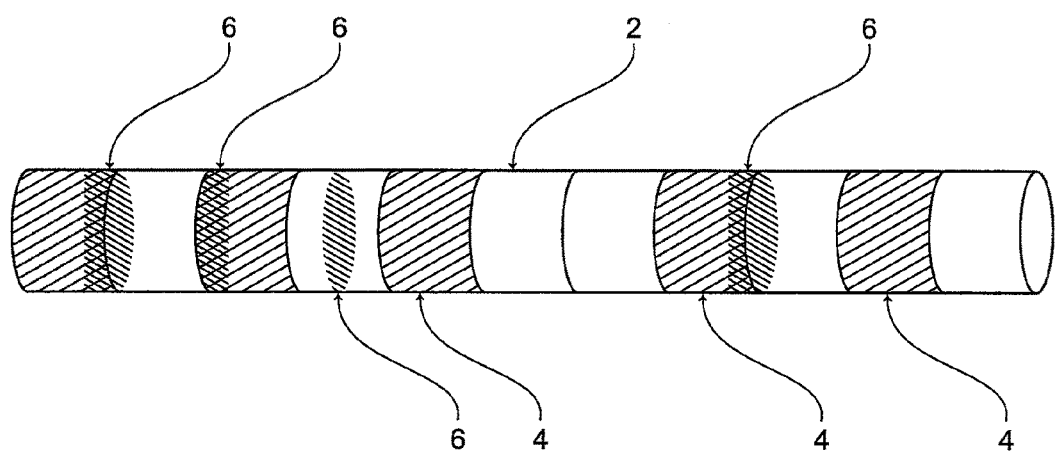
FIG. 3 shows the disk surface of FIG. 2 schematically illustrating the regions of the disk surface that have changed since a previous execution of a background task.

In some systems, only a small number of changes may be made between consecutive executions of a background task. FIG. 3 shows schematically an example of regions 6 on a disk where the data content may have changed between subsequent executions of a background task. As can be seen, in the example shown in FIG. 3, only a small percentage of the data written to the disk drive has changed. Accordingly, in a second embodiment, a record is kept of all changes made to the data content of regions of the array following completion of a prior execution of the background task. In this respect, following completion of a background task, a record is kept of regions of an array in which the data content has been changed. When the background task is next initiated, the record is consulted and the background task is executed on only those regions of the array for which a record has been kept indicating that a change has taken place.

In this second embodiment, once the background task has been executed on a particular region of the array, the entry associated with that region in the record of updates is deleted. While the background task is being executed, if a further change is made to the data content of a region of the array for which there is no entry or for which the entry in the record of updates has been deleted, a further entry will be made. Prior to completion of the background task, the record of updates will be consulted again and the background task will additionally be executed on any regions of the array for which an additional entry has been made. This iterative process continues until there are no entries in the record of updates.

This second embodiment further minimises the burden on the system processor of performing a background task on regions of the array where it is not strictly required.

Figure 5:
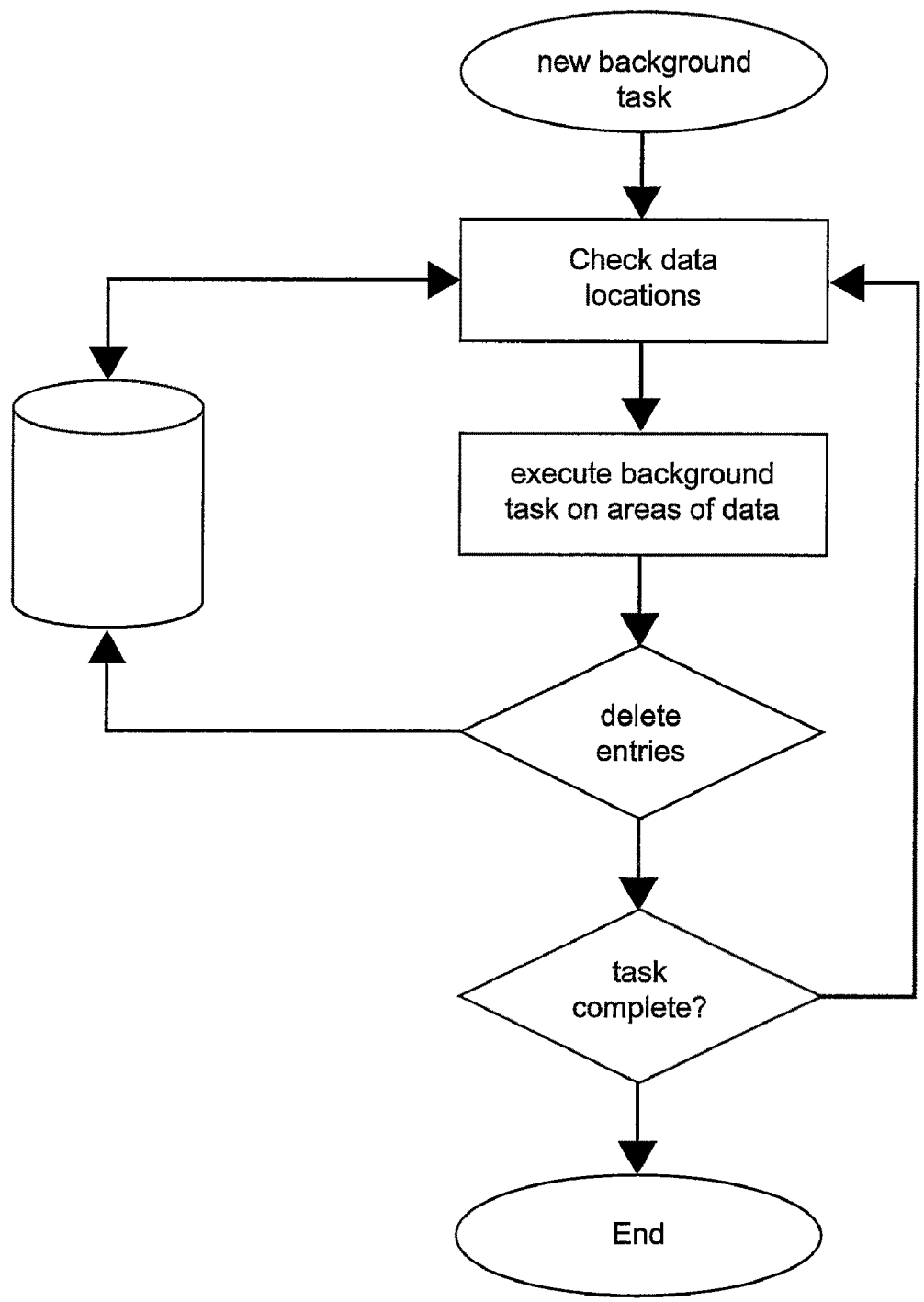
FIG. 5 shows a flowchart of an example of a method according to an embodiment of the present invention of the recording of information to, for example, the data structure of FIG. 4.

FIG. 5 shows a flowchart that illustrates an example of a method of recording information. As can be seen, when the data content of a region of an array is changed, either as a result of existing data being deleted or new data being written to a region of the array, a host command is generated. This is received by a system controller determining where and when a background task should be executed. The location in the array where the data has been changed is checked against a record of updates, for example, of the type of data structure shown in FIG. 4. If an entry has already been made for a particular location, this change is ignored and the system awaits the next host command. If, however, there is no entry for that particular location a record is made of this change.

Figure 6:
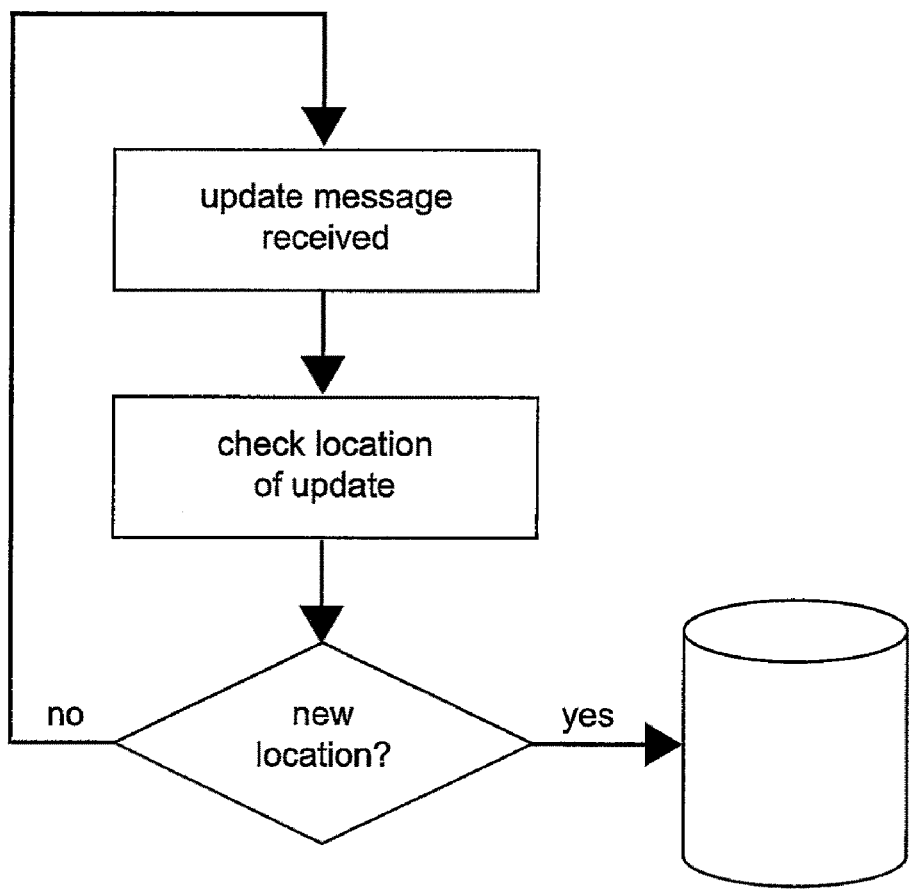
FIG. 6 shows a flowchart illustrating use of data stored in, for example, the data structure of FIG. 4, when running a background task.

In both of the above embodiments, only one entry per location in the array is required to ensure that the background task is executed on data stored at that location and every entry after the first for a particular address may be ignored until the original entry has been deleted. This is shown in the flowchart of FIG. 6. Here it can be seen that when a background task is initiated, the record of updates is checked to ascertain where in the array the background task should be executed. In the case of the first mode of operation this would be all regions of the array to which data has been written. In the case of the second mode of operation this would be all regions of the array where the data content has been changed following completion of the last execution of the same background task. Once the relevant regions have been determined, the background task is executed on only those regions of the array.

Once the background task has completed on a particular region of the array, the status of that location in the record of updates will be changed or the corresponding record deleted. For example, if when a change is made, a bit representative of a specific location in an array is changed to 1, this bit will be changed back to 0 once the background task has been executed on that region. If additional changes are made while the background task is being executed, a record is also kept of these changes and the background task will subsequently be executed on these additional regions of the array. Accordingly, once the background task has completed on the last region of the array determined by the record of updates, the record of updates will be rechecked to see if there are any additional regions of the array in which the data content has been changed while the background task was being processed.

Both of the above described embodiments individually reduce the burden on a system processor by minimising the amount of processing power and time required for a background task. However, in a preferred embodiment, the first embodiment would be implemented to initialise a background task and immediately upon its commencement, the second embodiment would be implemented. For example, the first embodiment may be used to ascertain which regions of the array contain data. The background task(s) can then be performed on only those regions of the array. Once an initial evaluation has been made of the regions of the array to which data has already been written, it is only necessary then to monitor in which regions of the array the data content changes. Accordingly, the second embodiment may be implemented to monitor changes to the data content of the array and the background tasks can then be performed on only those regions of the array in which the data content has changed.

The processing of the record that is kept of writes made to an array can be prioritised for maximum efficiency. It can be scheduled in quiet periods as a high priority task, or as a slower, ongoing, low priority task. As the amount of data stored is generally kept under management, dynamic priority control can be implemented. Accordingly, the rate of processing the recorded data can be controlled to minimise the amount of data that is un-checked. This can be viewed as many smaller check periods to minimise the burden on the system at any one time.

All of the above described embodiments used in isolation or in combination will in general be more efficient than the traditional methods of scheduling the background tasks described above, or, in the worst case, will be equally efficient.

Embodiments of the present invention have been described with particular reference to the examples illustrated. However, it will be appreciated that variations and modifications may be made to the examples described within the scope of the present invention.

The invention claimed is:

1. A method of executing a background task on an array of data storage devices, the method comprising:
   recording information about where in an array data is stored;
   executing a background task only on those regions of the array in which data is stored;
   monitoring the amount of recorded information; and
   initiating execution of the background task once the amount of recorded information reaches a predetermined level.

2. A method as claimed in claim 1, comprising:
   monitoring the amount of recorded information; and
   deleting the recorded information once the amount of recorded information reaches a predetermined level.

3. A method as claimed in claim 1, comprising:
   monitoring the number of regions for which information is recorded; and
   deleting the recorded information when the number of regions for which data is recorded reaches a predetermined percentage of the total number of regions of the array.

4. A method as claimed in claim 1, comprising:
   monitoring the number of regions for which information is recorded; and
   initiating execution of the background task once the number of regions for which information is recorded reaches a predetermined percentage of the total number of regions of the array.

5. A method of executing a background task on an array of data storage devices, the method comprising:
   recording information about where in an array data content is changed following completion of the last execution of a background task; and
   executing the background task only on those regions of the array where the data content has been changed since the last execution of the background task.

6. A method as claimed in claim 5, comprising deleting the recorded information relating to a region of the array once the background task has been executed on said region of the array.

7. A method as claimed in claim 5, comprising:
   monitoring the amount of recorded information; and
   deleting the recorded information once the amount of recorded information reaches a predetermined level.

8. A method as claimed in claim 5, comprising:
   monitoring the amount of recorded information; and
   initiating execution of the background task once the amount of recorded information reaches a predetermined level.

9. A method as claimed in claim 5, comprising:
   monitoring the number of regions for which information is recorded; and
   deleting the recorded information when the number of regions for which data is recorded reaches a predetermined percentage of the total number of regions of the array.

10. A method as claimed in claim 5, comprising:
    monitoring the number of regions for which information is recorded; and initiating execution of the background task Once the number of regions for which information is recorded reaches a predetermined percentage of the total number of regions of the array.

11. A method as claimed in claim 5, wherein recording information comprises ignoring any attempt to record information for a location in the array for which an entry has already been made since the last execution of the background task.

12. An array controller for causing a background task to be executed on an array of data storage devices in which data is stored, the array controller comprising a processor arranged to:
    record information about where in an array data is stored;
    in accordance with the recorded information, initiate execution of a background task only on the regions of the array in which data is stored;
    monitor the amount of recorded information; and
    initiate execution of the background task once the amount of recorded information reaches a predetermined level.

13. An array controller as claimed in claim 12, wherein the processor is arranged to:
    monitor the amount of recorded information; and
    delete the recorded information once the amount of recorded information reaches a predetermined level.

14. An array controller as claimed in claim 12, wherein the processor is arranged to:
    monitor the number of regions for which information is recorded; and
    delete the recorded information when the number of regions for which data is recorded reaches a predetermined percentage of the total number of regions of the array.

15. An array controller as claimed in claim 12, wherein the processor is arranged to:
    monitor the number of regions for which information is recorded; and
    initiate execution of the background task once the number of regions for which information is recorded reaches a predetermined percentage of the total number of regions of the array.

16. An array controller as claimed in claim 12, wherein the processor is arranged when recording information to ignore any attempt to record information for a location in the array for which an entry has already been made following the last execution of the background task.

17. An array controller for causing a background task to be executed on an array of data storage devices, the array controller comprising a processor arranged to:
    record information about where in an array data content is changed following completion of the last execution of a background task; and
    in accordance with the recorded information, initiate execution of a background task only on the regions of the array where data content has been changed since the last execution of the background task.

18. An array controller as claimed in claim 17, wherein the processor is arranged to delete the recorded information relating to that region of the array once the background task has been executed on a region of the array.

19. An array controller as claimed in claim 17, wherein the processor is arranged to:
    monitor the amount of recorded information; and
    delete the recorded information once the amount of recorded information reaches a predetermined level.

20. An array controller as claimed in claim 17, wherein the processor is arranged to:
    monitor the amount of recorded information; and
    initiate execution of the background task once the amount of recorded information reaches a predetermined level.

21. An array controller as claimed in claim 17, wherein the processor is arranged to:
    monitor the number of regions for which information is recorded; and
    delete the recorded information when the number of regions for which data is recorded reaches a predetermined percentage of the total number of regions of the array.

22. An array controller as claimed in claim 17, wherein the processor is arranged to:
    monitor the number of regions for which information is recorded; and
    initiate execution of the background task once the number of regions for which information is recorded reaches a predetermined percentage of the total number of regions of the array.

23. An array controller as claimed in claim 17, wherein the processor is arranged when recording information to ignore any attempt to record information for a location in the array for which an entry has already been made following the last execution of the background task.

* * * * *